(12) United States Patent
Brison

(10) Patent No.: US 11,412,862 B2
(45) Date of Patent: Aug. 16, 2022

(54) STORAGE AND DISPENSING SYSTEM FOR BEVERAGE ACCESSORIES

(71) Applicant: Sabrina Brison, North Plainfield, NJ (US)

(72) Inventor: Sabrina Brison, North Plainfield, NJ (US)

( * ) Notice: Subject to any disclaimer, the term of this patent is extended or adjusted under 35 U.S.C. 154(b) by 128 days.

(21) Appl. No.: 17/003,018

(22) Filed: Aug. 26, 2020

(65) Prior Publication Data

US 2021/0127852 A1 May 6, 2021

Related U.S. Application Data

(60) Provisional application No. 62/929,348, filed on Nov. 1, 2019.

(51) Int. Cl.
| | | |
|---|---|---|
| *A47F 1/08* | (2006.01) | |
| *A47F 1/06* | (2006.01) | |
| *B65G 1/08* | (2006.01) | |
| *B67D 1/08* | (2006.01) | |

(52) U.S. Cl.
CPC ............ *A47F 1/08* (2013.01); *A47F 1/065* (2013.01); *B65G 1/08* (2013.01); *B67D 1/0891* (2013.01)

(58) Field of Classification Search
CPC ... A47F 1/08; A47F 1/065; A47F 7/00; B65G 1/08; B65D 1/0891
USPC .......................................... 221/124, 1, 49.1
See application file for complete search history.

(56) References Cited

U.S. PATENT DOCUMENTS

| | | | | |
|---|---|---|---|---|
| 2,150,306 A | * | 3/1939 | Wessman | A47F 1/085 221/281 |
| 2,176,384 A | * | 10/1939 | Varney | A47F 1/12 221/311 |
| 2,740,551 A | * | 4/1956 | Carew | A47F 1/106 221/45 |
| 3,331,533 A | * | 7/1967 | Krugger | A47F 1/085 221/96 |
| 3,528,558 A | * | 9/1970 | Williams | A47F 7/28 211/126.1 |
| 3,643,808 A | * | 2/1972 | Ryan | A47F 5/0025 211/134 |
| 3,926,335 A | * | 12/1975 | Dangles | A61J 7/04 206/533 |
| 4,033,478 A | * | 7/1977 | House | G07F 11/16 221/279 |

(Continued)

FOREIGN PATENT DOCUMENTS

WO  WO-2013106742 A1 * 7/2013 ............... A47F 1/08

*Primary Examiner* — Rakesh Kumar
(74) *Attorney, Agent, or Firm* — Boudwin Intellectual Property; Daniel Boudwin

(57) ABSTRACT

A storage and dispensing system for beverage accessories is provided. The storage and dispensing system for beverage accessories has a planar base, a single-serve beverage pod storage container, and a plurality of drinking accessory dispensing channels. The pod storage container includes at least one sidewall disposed orthogonally to a top surface of the planar base. The pod storage container also includes a channel that is sized to receive a single pod at a time. A gate is disposed on a terminal end of the channel which prevents pods from sliding out of the channel. Each of the plurality of accessory dispensing channels is sized to receive at least one drinking accessory such as a cup or lid.

15 Claims, 3 Drawing Sheets

(56) References Cited

U.S. PATENT DOCUMENTS

| | | | | |
|---|---|---|---|---|
| 4,090,637 A * | 5/1978 | Williamson | A47F 1/085 | 221/92 |
| 4,479,583 A * | 10/1984 | Franklin | A47F 1/08 | 211/75 |
| 4,590,975 A * | 5/1986 | Credle, Jr. | F25C 5/20 | D7/308 |
| 5,201,191 A * | 4/1993 | Bustos | A47F 3/0408 | 211/187 |
| 5,458,232 A * | 10/1995 | Novak | B65G 1/07 | 206/556 |
| 5,477,981 A * | 12/1995 | Heyl | B65D 83/0454 | 206/533 |
| 5,673,814 A * | 10/1997 | Terashima | G01N 35/00029 | 221/232 |
| 5,992,651 A * | 11/1999 | Shaw | A47F 5/13 | 211/59.2 |
| 6,053,359 A * | 4/2000 | Goulet | B65G 47/22 | 221/221 |
| 6,502,408 B1 * | 1/2003 | Corcoran | F25D 31/007 | 62/250 |
| 7,690,518 B2 * | 4/2010 | Fincher | A47F 1/12 | 211/59.2 |
| 8,025,180 B2 * | 9/2011 | Magno | G07F 11/24 | 221/121 |
| 8,136,666 B2 * | 3/2012 | Goldman | B65D 83/0454 | 220/253 |
| 8,651,288 B2 * | 2/2014 | Squitieri | A47F 1/12 | 211/184 |
| 2001/0035426 A1 * | 11/2001 | Chamorro | G07F 17/18 | 222/105 |
| 2002/0170868 A1 * | 11/2002 | Morgan | A47G 23/08 | 211/163 |
| 2005/0029303 A1 * | 2/2005 | Mehes | A47F 1/085 | 222/192 |
| 2005/0082308 A1 * | 4/2005 | Simson | G07F 11/24 | 221/105 |
| 2007/0007221 A1 * | 1/2007 | Mann | A47F 1/087 | 211/59.3 |
| 2009/0139880 A1 * | 6/2009 | Abdullah | A45C 11/36 | 206/214 |
| 2012/0097694 A1 * | 4/2012 | Gelardi | A47F 1/087 | 221/173 |
| 2013/0264351 A1 * | 10/2013 | Bogdziewicz, III | A47F 1/08 | 221/1 |
| 2017/0096324 A1 * | 4/2017 | Dresser | B67D 1/1236 | |
| 2017/0164762 A1 * | 6/2017 | Bryson | A47F 7/281 | |
| 2019/0144255 A1 * | 5/2019 | Dresser | B67D 1/0881 | 141/94 |
| 2020/0107651 A1 * | 4/2020 | McKeever | A47F 1/065 | |
| 2021/0127852 A1 * | 5/2021 | Brison | B67D 1/0891 | |

* cited by examiner

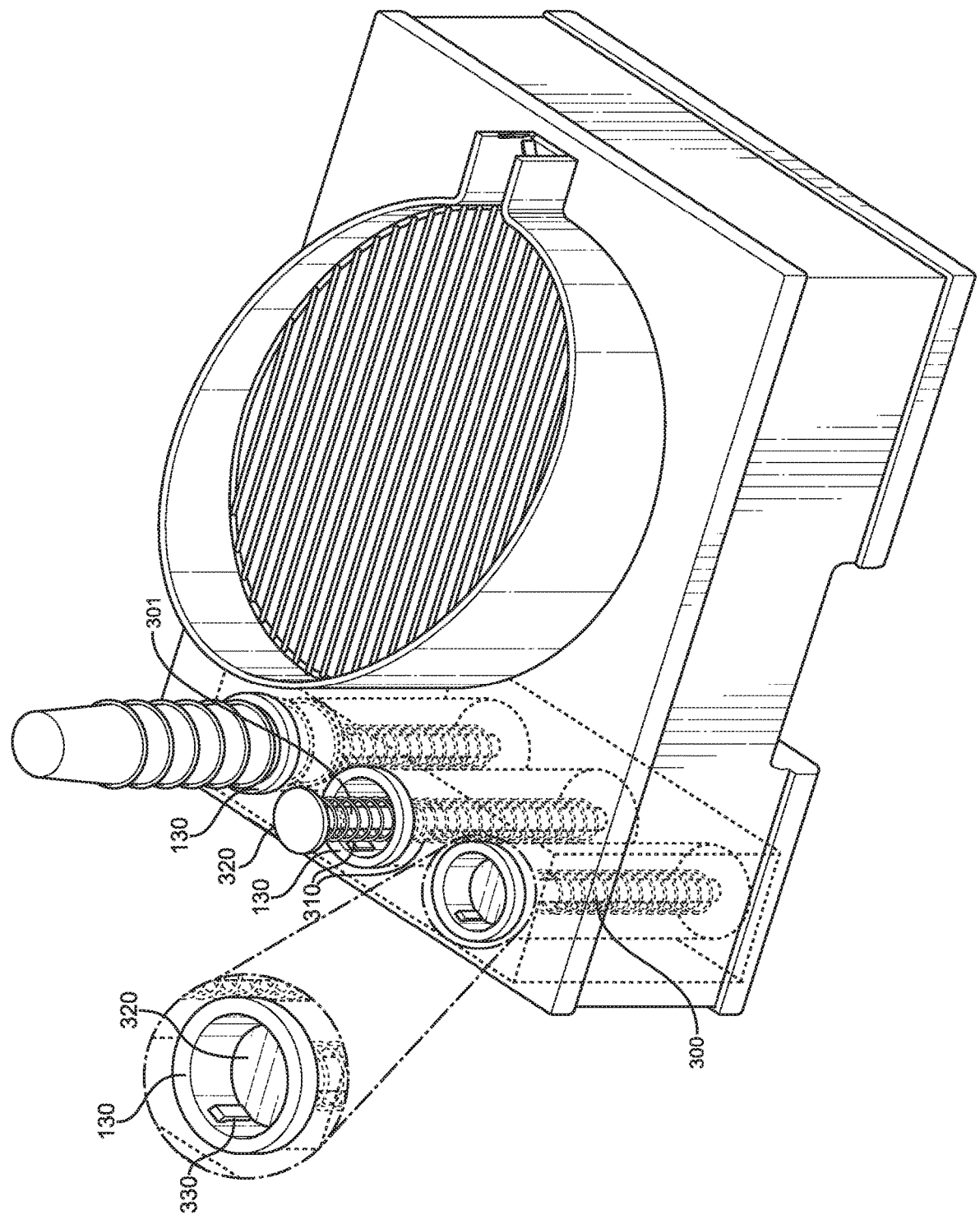

STORAGE AND DISPENSING SYSTEM FOR BEVERAGE ACCESSORIES

CROSS REFERENCE TO RELATED APPLICATIONS

This application claims the benefit of U.S. Provisional Application No. 62/929,348 filed on Nov. 1, 2019. The above identified patent application is herein incorporated by reference in its entirety to provide continuity of disclosure.

BACKGROUND OF THE INVENTION

The present invention relates to beverage accessory dispensers. More particularly, the present invention provides for a system that can store and dispense various beverage accessories including cups, lids, and single-serve beverage pods.

Many people enjoy making their own beverages at home or in a shared environment such as an office kitchenette. Preparation of such beverages typically entails finding an appropriately sized cup or mug, obtaining pre-packaged single-serve pods that contain the dry ingredients for the beverage, and finding appropriately sized lids to secure to the cup once the beverage is made to prevent spillage. These cups, lids, and single-serve beverage pods may be located in various distinct parts of the kitchenette. People may have to search through multiple cabinets, drawers, closets, and the like in order to locate the items. Such a search can take a considerable amount of time and may result in the person discovering that they are out of stock of the desired item.

Devices have been disclosed in the known art that relate to beverage accessory dispensers. These include devices that have been patented and disclosed in patent application publications. However, the devices in the known art have several drawbacks. Some beverage accessory dispensers only store and dispense one type of item at a time. These devices do not provide a user with all of the accessories that they may need to enjoy their beverage in one unit. Other beverage accessory dispensers must be installed within a counter or similar space. These units are not free-standing and cannot be moved around from one area to the next. Additionally, these units must be permanently installed resulting in reduced usable counter-space.

The present invention substantially diverges in design elements from the known art and consequently it is clear that there is a need in the art for an improvement to existing beverage accessory dispenser devices. In this regard the present invention substantially fulfills these needs.

SUMMARY OF THE INVENTION

In view of the foregoing disadvantages inherent in the known types of beverage accessory dispensers now present in the art, the present invention provides for a system that can store and dispense various beverage accessories including cups, lids, and single-serve beverage pods. The present storage and dispensing system for beverage accessories has a planar base, a single-serve beverage pod storage container, and a plurality of drinking accessory dispensing channels. The pod storage container includes at least one sidewall disposed orthogonally to a top surface of the planar base. The pod storage container also includes a channel that is sized to receive a single pod at a time. A gate is disposed on a terminal end of the channel which prevents pods from sliding out of the channel. Each of the plurality of accessory dispensing channels is sized to receive at least one drinking accessory such as a cup or lid.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3 shows a perspective view of an embodiment of the storage and dispensing system for beverage accessories, with a focus on a plurality of accessory dispensing channels.

DETAILED DESCRIPTION OF THE INVENTION

Figure 1:
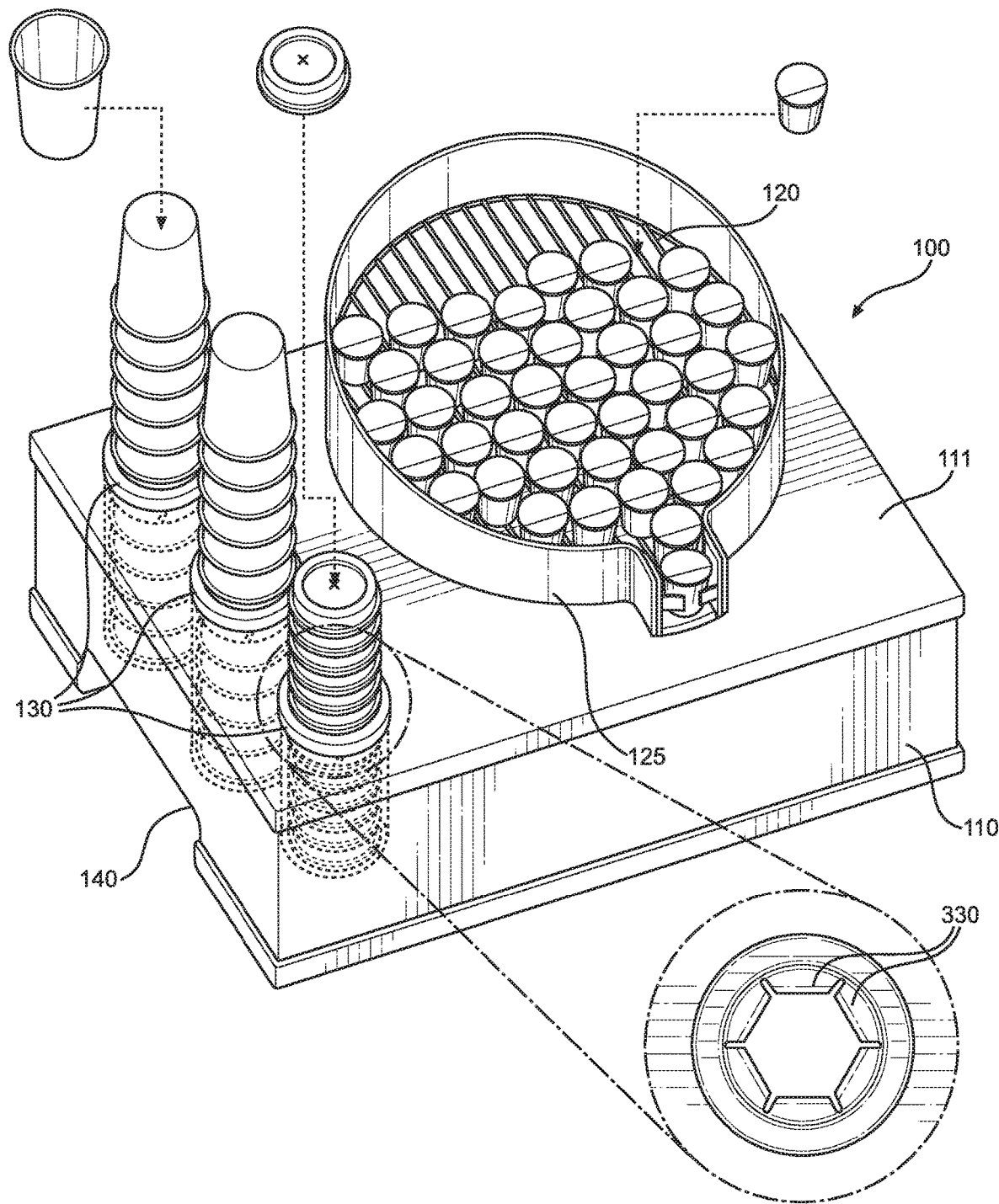
FIG. 1 shows a perspective view of an embodiment of the storage and dispensing system for beverage accessories, in use.

Reference is made herein to the attached drawings. Like reference numerals are used throughout the drawings to depict like or similar elements of the storage and dispensing system for beverage accessories. For the purposes of presenting a brief and clear description of the present invention, a preferred embodiment will be discussed as used for the storage and dispensing system for beverage accessories. The figures are intended for representative purposes only and should not be considered to be limiting in any respect.

Referring now to FIG. 1, there is shown a perspective view of an embodiment of the storage and dispensing system for beverage accessories, in use. The storage and dispensing system for beverage accessories 100 comprises a planar base 110, a pod storage container 120, and a plurality of accessory dispensing channels 130. In the shown embodiment, the planar base 110 comprises a square shape in order to fit neatly into the corner of a countertop. However, other shapes for the planar base 110 are contemplated and various contours and curves can be utilized to seamlessly integrate the storage and dispensing system for beverage accessories 100 into a desired location and orientation. In the shown embodiment, the planar base 110 further comprises a cutout 140 disposed on a bottom surface thereof. The cutout 140 provides a variety of benefits including allowing the storage and dispensing system for beverage accessories 100 to rest on top of uneven surfaces, such as wiring for kitchen machinery, without damaging the underlying items. Such a cutout 140 also provides a storage space for such wiring, or for additional kitchen implements and utensils. The cutout 140 can also function as a pair of handles enabling a user to easily grasp the planar base 110 via the cutout 140 and transport the storage and dispensing system for beverage accessories 100 to a desired location.

The pod storage container 120 comprises at least one sidewall 125 disposed on a top surface 111 of the planar base 110. In the shown embodiment, the sidewall 125 is disposed orthogonally to the top surface 111 to provide a straight vertical barrier wall for the pod storage container 120. In other embodiments, the at least one sidewall 125 can be disposed at an angle relative to the planar base 110 to provide sloped sidewalls 125. Such sloped sidewalls 125 can provide advantages such as maximizing storage capacity and enabling the pod storage container 120 to fit within irregular spaces. The pod storage container 120 is configured to display and store single-serve beverage pods (as shown in FIG. 1). In the shown embodiment, the sidewall 125 comprises an annular shape in order to maximize the storage space for the pods as such pods typically comprise a circular cross-section.

Figure 2A:
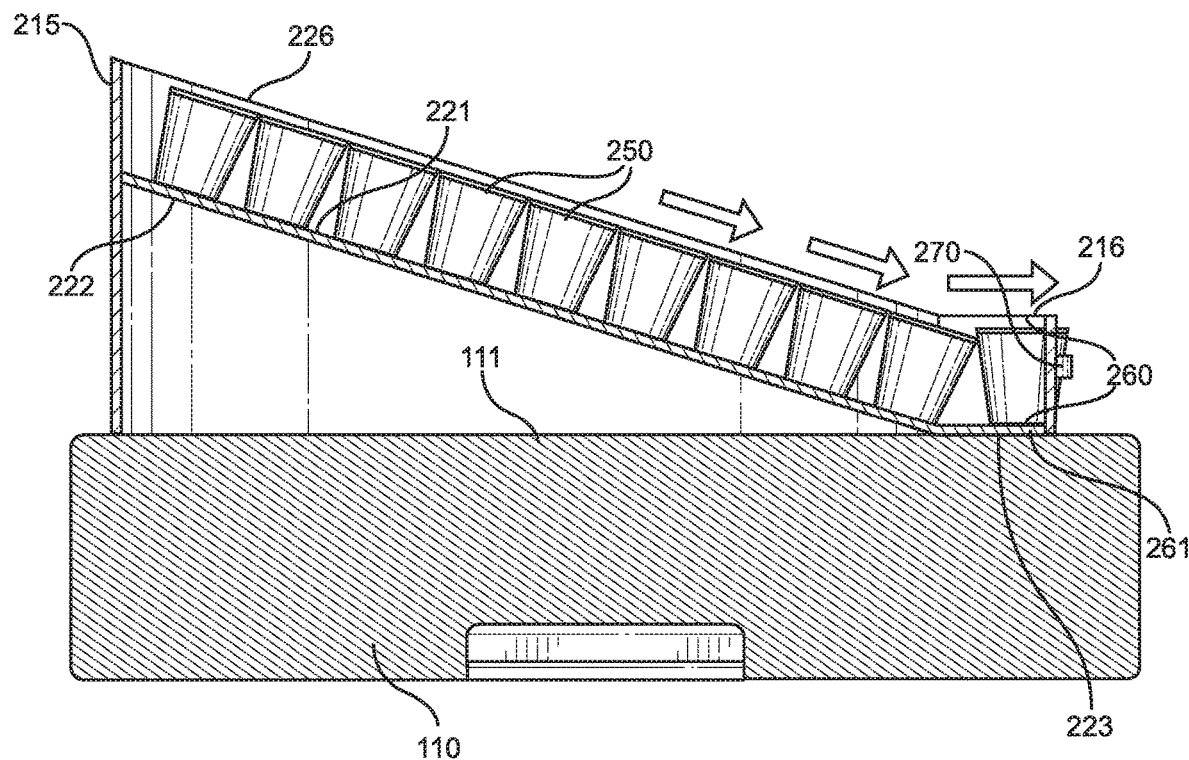
FIG. 2A shows a cross-sectional view of an embodiment of the storage and dispensing system for beverage accessories, with a focus on the pod storage container and pod channel.
Figure 2B:
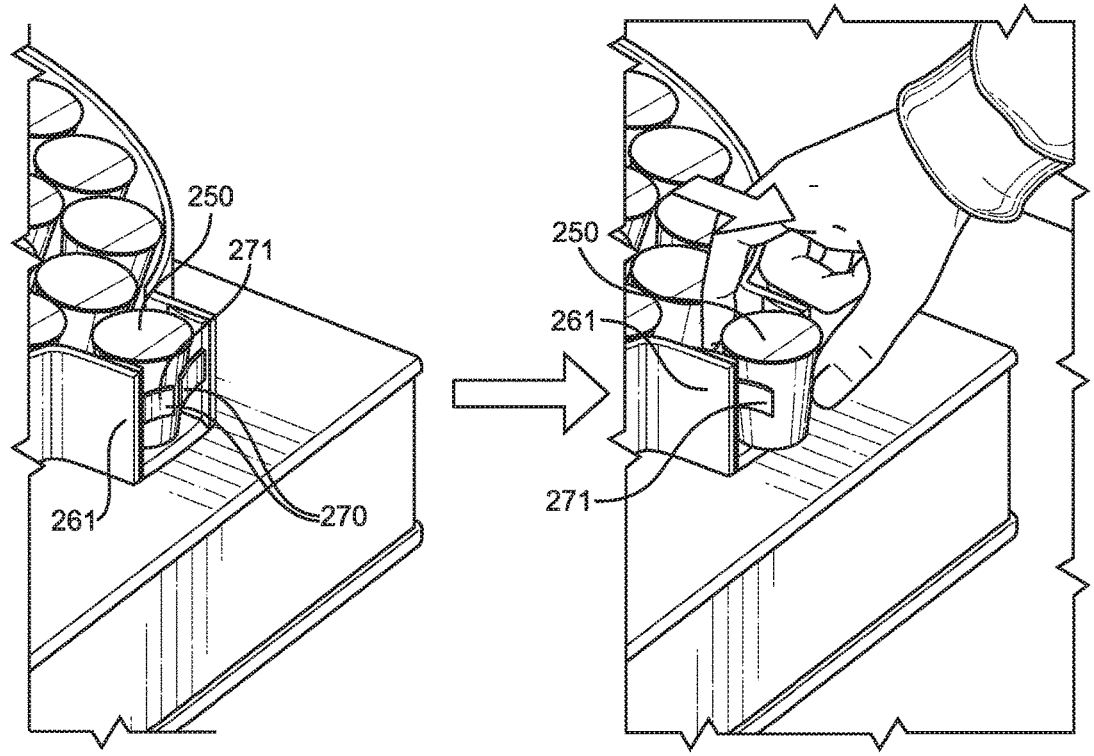
FIG. 2B shows a perspective view of an embodiment of the storage and dispensing system for beverage accessories, with a focus on the pod channel.

Referring now to FIGS. 2A and 2, there is shown a cross-sectional view of an embodiment of the storage and dispensing system for beverage accessories, with a focus on the pod storage container and pod channel, and a perspective view of an embodiment of the storage and dispensing system for beverage accessories, with a focus on the pod channel. In one embodiment, a sidewall height progressively decreases from a higher rear sidewall surface 215 to a lower front sidewall surface 216. This increased height in the rear of the pod storage container enables taller items to be placed in the back and shorter items in the front. In a further embodiment, a height of a pod storage floor 221 relative to the top surface 111 of the planar base 110 progressively decreases from a higher rear floor surface 222 to a lower front floor surface 223. The progressive decrease defines a slope to the pod storage floor 221 which enables pods 250 stored therein to slide towards the front of the device. In a further embodiment, the slope of the pod storage floor 221 is identical to the slope defined by the progressive decrease in the sidewall height. In such an embodiment, the distance between the pod storage floor 221 and a top surface of the sidewall 226 is consistent throughout the pod storage container 120. In another embodiment, a top surface of the pod storage floor 221 comprises evenly spaced ridges (as shown in FIG. 1). The ridges provide a greater surface area to interface with single-serve beverage pods 250 held within.

The pod storage container further comprises a pod channel 260 sized to receive a single pod 250. In the shown embodiment, the pod channel 260 is a continuation of the sidewall 226. In this manner, the sidewall 226 can funnel pods 250 towards the pod channel 260. A gate 270 is disposed on a terminal end 261 of the pod channel 260. The gate 270 is configured to keep a pod 250 within the pod channel 260 and prevent the pod 250 from slipping, sliding, or falling out. In some embodiments, the gate 270 is spring biased towards a closed position. In other embodiments, the gate 270 is hingedly connected to the pod storage container. In the shown embodiment, the gate 270 comprises a pair of flexible tabs 271. The flexible tabs 271 enable a user to slide a pod 250 through the gate 270 without damaging or breaking the gate 270. In the shown embodiment, a gap is formed between the flexible tabs 271 in order to minimize the amount of materials necessary to form the gate 270.

Referring now to FIG. 3, there is shown a perspective view of an embodiment of the storage and dispensing system for beverage accessories, with a focus on a plurality of accessory dispensing channels. Each of the plurality of accessory dispensing channels 130 are sized to receive at least a portion of at least one drinking accessory (as shown in FIG. 1). In the embodiment shown in FIG. 1, the accessory dispensing channels 130 are sized to receive at least a brim of a beverage container or corresponding lid. In one embodiment, the accessory dispensing channels 130 are sized to receive up to twelve disposable beverage cups, stacked one inside another. The drinking accessories can be a wide variety of shapes and sizes of beverage cups and corresponding lids. Additionally, although the embodiment shown in FIG. 1 depicts three accessory dispensing channels 130 and a single pod storage container 120, the present disclosure contemplates varying amounts of either depending on the needs of the user. The present disclosure also contemplates additional storage compartments and recesses integrated into the planar base as may be necessary for storing additional accessories such as straws, creamer packets, stirring rods, sugar packets, condiment packets, and the like.

In the shown embodiment, the plurality of accessory dispensing channels 130 is spring biased towards a dispensing position. In the shown embodiment, each of the accessory dispensing channels 130 further comprise a compressible rod 300 attached to a spring 310, wherein the compressible rod 300 is spring biased towards the dispensing position. The compressible rod 300 provides the benefit of keeping the spring 310 in a desired orientation and prevents the spring 310 from flailing within the accessory dispensing channel 130. Further, a terminal end 301 of the compressible rod 300 further comprises a planar plate 320 disposed orthogonal to a length of the compressible rod 300. In one embodiment, the compressible rod 300 is received within an aperture disposed in a floor of the accessory dispensing channel 130. In one embodiment, the spring 310 is disposed around such a compressible rod 300, the compressible rod 300 is thus spring biased towards a dispensing position. In the shown embodiment, a compressible rod radius is less than a planar plate radius. Further, in the shown embodiment, a diameter of the accessory dispensing channel 130 is larger than a diameter of the drinking accessory stored therein.

In one embodiment, the accessory dispensing channel 130 further comprises a lip 330. The lip 330 is sized and configured to engage a perimeter of a brim of a drinking accessory such as a cup (as shown in FIG. 1, above). In the shown embodiment, the lip 330 is a pair of flexible annular strips disposed inside the accessory dispensing channel 130. The lip 330 exerts enough force to prevent the drinking accessories from sliding out of the accessory dispensing channel 130. The flexibility of the lip 330 allows for a user to pull a drinking accessory out of the accessory dispensing channel 130. In one embodiment, the lip 330 is a single protrusion that extends around an entire circumference of the inner surface of the accessory dispensing channel 130. In other embodiments, the lip 330 comprises multiple segments disposed around the circumference of the inner surface of the accessory dispensing channel 130. In the embodiment shown in FIG. 1, for example, the lip 330 comprises six segments equally spaced around the circumference of the inner surface of the accessory dispensing channel 130. In the embodiment shown in FIG. 3, the lip 330 comprises a pair of spring biased strips. In various embodiments, the segments are flexible to enable a drinking accessory to pass once sufficient force is exerted to cause the segments to flex.

In use the storage and dispensing system for beverage accessories can be used to store and dispense a variety of drinking and beverage accessories including single-serve beverage pods, cups, and associated lids. The single-serve beverage pods can be stored in the pod storage container and dispensed, one-by-one through the pod channel and past the gate. Drinking accessories such as cups and lids can be stored in a plurality of accessory dispensing channels 130. In some embodiments, the accessory dispensing channels 130 are biased towards a dispensing position, wherein the dispensing position is defined when the compressible rod 300 is extended as far as possible, to ensure that a drinking accessory is easily retrieved by a user. In further embodiments, the accessory dispensing channels 130 further comprise a lip 330 which enables the drinking accessories to be easy dispensed one-by-one. The storage and dispensing system for beverage accessories includes a cutout which can be used as a storage space, or which can define a handle to enable easy transport of the device from one location to another.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage and dispensing system for beverage accessories, comprising:
   a planar base;
   the planar base includes a top surface, a front surface, a rear surface, and a pair of opposing side surfaces;
   the pair of opposing side surfaces further comprise a cutout;
   a pod storage container disposed on the top surface of the planar base;
   the pod storage container comprising at least one sidewall disposed orthogonally to the top surface of the planar base;
   the pod storage container further comprises a sloped pod storage floor;
   the pod storage container further comprising a pod channel sized to receive a single pod;
   wherein the at least one sidewall and the sloped pod storage floor of the pod storage container is biased towards the pod channel;
   a gate disposed on a terminal end of the pod channel;
   a plurality of accessory dispensing channels disposed through the top surface of the planar base;
   whereby each of the accessory dispensing channels of the plurality of accessory dispensing channels further comprises a spring encircling a compressible rod, wherein the compressible rod is spring biased towards a dispensing position; and
   each of the plurality of accessory dispensing channels sized to receive a portion of at least one drinking accessory.

2. The storage and dispensing system for beverage accessories of claim 1, wherein the accessory dispensing channel further comprises a lip, the lip sized and configured to engage a perimeter of a brim of a drinking accessory.

3. The storage and dispensing system for beverage accessories of claim 1, wherein the sidewall comprises an annular shape.

4. The storage and dispensing system for beverage accessories of claim 1, wherein a top surface of a pod storage floor comprises evenly spaced ridges, whereby the pod storage floor is angled downwardly from the rear surface to the front surface.

5. The storage and dispensing system for beverage accessories of claim 1, wherein the gate comprises a pair of flexible tabs, wherein the gate is spring biased towards a closed position.

6. The storage and dispensing system for beverage accessories of claim 1, wherein the gate is hingedly connected to the pod storage container.

7. The storage and dispensing system for beverage accessories of claim 1, wherein the plurality of accessory dispensing channels is spring biased towards a dispensing position.

8. The storage and dispensing system for beverage accessories of claim 1, wherein an accessory dispensing channel diameter is larger than a drinking accessory diameter.

9. The storage and dispensing system for beverage accessories of claim 1, wherein a terminal end of the compressible rod further comprises a planar plate disposed orthogonal to a length of the compressible rod.

10. The storage and dispensing system for beverage accessories of claim 1, wherein a spring is disposed around a compressible rod, the compressible rod spring biased towards a dispensing position.

11. A storage and dispensing system for beverage accessories, comprising:
    a planar base;
    the planar base includes a top surface, a front surface, a rear surface, and a pair of opposing side surfaces;
    the pair of opposing side surfaces further comprise a cutout;
    a pod storage container disposed on the top surface of the planar base;
    the pod storage container comprising at least one sidewall disposed orthogonally to the top surface of the planar base;
    the pod storage container further comprises a sloped pod storage floor;
    wherein a sidewall height progressively decreases from a higher rear sidewall surface to a lower front sidewall surface;
    the pod storage container further comprising a pod channel sized to receive a single pod;
    wherein the at least one sidewall and the sloped pod storage floor of the pod storage container is biased towards the pod channel;
    a gate disposed on a terminal end of the pod channel;
    a plurality of accessory dispensing channels disposed through the top surface of the planar base;
    whereby each of the accessory dispensing channels of the plurality of accessory dispensing channels further comprises a spring encircling a compressible rod, wherein the compressible rod is spring biased towards a dispensing position; and
    each of the plurality of accessory dispensing channels sized to receive at least one drinking accessory.

12. The storage and dispensing system for beverage accessories of claim 11, wherein the accessory dispensing channel further comprises a lip, the lip sized and configured to engage a perimeter of a brim of a drinking accessory.

13. The storage and dispensing system for beverage accessories of claim 11, wherein the plurality of accessory dispensing channels is spring biased towards a dispensing position.

14. The storage and dispensing system for beverage accessories of claim 11, wherein the sidewall comprises an annular shape.

15. The storage and dispensing system for beverage accessories of claim 11, wherein a pod storage floor height progressively decreases from a higher rear surface to a lower front surface.

* * * * *